US005961836A

United States Patent [19]

Egraz et al.

[11] Patent Number: 5,961,836
[45] Date of Patent: Oct. 5, 1999

[54] METHOD OF PRODUCING MILLING ADJUVANTS AND/OR DISPERSIVE AGENTS, BY PHYSICOCHEMICAL SEPARATION; ADJUVANTS AND AGENTS THUS OBTAINED; AND USES OF SAME

[75] Inventors: Jean-Bernard Egraz, Ecully; Georges Ravet, Saint-Genis-les-Ollieres, both of France; Matthias Buri, Rothrist; René Blum, St. Urban, both of Switzerland

[73] Assignee: Coatex S.A., Genay, France

[21] Appl. No.: 09/173,802

[22] Filed: Oct. 16, 1998

Related U.S. Application Data

[60] Continuation of application No. 08/572,047, Dec. 14, 1995, which is a division of application No. 08/645,755, May 14, 1996.

[30] Foreign Application Priority Data

Dec. 16, 1994 [FR] France ................................. 94 15440

[51] Int. Cl.⁶ .................................................... B01D 61/00
[52] U.S. Cl. .......................... 210/652; 210/651; 210/653
[58] Field of Search .................................... 210/650, 651, 210/652, 653, 767, 638

[56] References Cited

U.S. PATENT DOCUMENTS

| 4,340,722 | 7/1982 | Arnal et al. | 210/651 |
| 5,432,238 | 7/1995 | Egraz et al. | 525/330.3 |
| 5,736,601 | 4/1998 | Egraz et al. | 525/330.2 |

OTHER PUBLICATIONS

Patent Abstracts of Japan, vol. 11, No. 315, Oct. 14, 1987, JP-A-62 101693, May 12, 1987.
Patent Abstracts of Japan, vol. 15, No. 221, Jun. 6, 1991, JP-A-30 66705, Mar. 22, 1991.
Patent Abstracts of Japan, vol. 17, No. 452, Aug. 19, 1993, JP-A-51 05495, Apr. 27, 1993.

*Primary Examiner*—Ana Fortuna
*Attorney, Agent, or Firm*—Oblon, Spivak, McClelland, Maier & Neustadt, P.C.

[57] ABSTRACT

A method of producing milling adjuvants and/or dispersing agents, with the use of a separation apparatus which is comprised of one or more organic and/or mineral membranes; a milling adjuvant and/or dispersing agent produced by said method; and use of said adjuvant/agent in preparing an aqueous suspension of mineral particles; and the use of the aqueous suspension in applications involving pigments.

7 Claims, No Drawings

METHOD OF PRODUCING MILLING ADJUVANTS AND/OR DISPERSIVE AGENTS, BY PHYSICOCHEMICAL SEPARATION; ADJUVANTS AND AGENTS THUS OBTAINED; AND USES OF SAME

This application is a continuation of Ser. No. 08/572,047, filed on Dec. 14, 1995, pending which is a divisional of application Ser. No. 08/645,755, filed May 14, 1996 pending.

BACKGROUND OF THE INVENTION

1. Field of the Invention

The invention relates to a method of producing a milling adjuvant or dispersing agent, by physicochemical separation of vinyl polymers or copolymers, acrylic polymers or copolymers, or polycondensate polymers or copolymers, by at least one technique of extraction, filtration, ultrafiltration, nanofiltration, or reverse osmosis.

The invention also relates to a milling adjuvant or dispersing agent, resulting from one of the above-mentioned separation methods, and use of this adjuvant or agent in producing an aqueous suspension of mineral particles intended for use in an application involving a pigment.

The invention further relates to an aqueous suspension of mineral particles which contain the adjuvant or agent. In addition, the invention relates to an application of the suspension to a pigment technology, e.g. paper, paint and other coating, plastic. The invention also relates to a drilling technology, public works, a ceramic, and other areas.

2. Description of the Prior Art

Means of separation of polymers in solution are known to persons skilled in the art. A phase equilibration method disclosed in Cantow, M. R. J., "Polymer fractionation", Academic Press,, N.Y.C. (1967), describes the separation of polymers according to molecular weight or chemical composition but does not enable production of an adjuvant specifically useful for milling or an agent specifically useful for dispersion of a pulverulent material, and does not employ a membrane.

Other references such as Fr. Pat. 2,488,814 and Eur. Pats. 0,127,388 and 0,542,643, or Eur. Pat. 0,499,267 describe a method of separating a water-soluble acrylic polymer or copolymer of different molecular weights, with the aim of producing a milling adjuvant or dispersing agent for pulverulent mineral particles in an aqueous suspension, for use in an application involving a pigment.

These methods, based on differences in solubility of polymers of different molecular weights in a solution containing a polar solvent such as isopropanol, are hazardous to employ and are increasingly subject to legal restrictions. Furthermore, these methods do not allow separation of acrylic polymers or copolymers in a fully acidic state.

An advantage of separation of acrylic polymers or copolymers in the fully acidic state is that it allows any of a wide range of neutralizing agents to be employed in neutralizing the fractions employed in a given application.

Historically, numerous approaches have been made to exploit differences in solubility for purposes of separation, but even those which give good separation results have not been entirely satisfactory. The present applicant did not believe that the state of the art methods were subject to appreciable further improvement.

SUMMARY OF THE INVENTION

The applicant investigated a radically different approach, which has led to development of a separation method, usable in either a continuous or batch process, wherein one may optionally operate with no organic solvent, or with an immiscible solvent, and wherein one has broad choice of certain other parameters such as

- neutralization of acid groups in the polymer(s) or copolymer(s),
- concentration of the medium,
- temperature,
- optionally polarity of the solvent,
- optionally type of any purely organic solvent used.

This object and other objects as will be better understood from the following description have been obtained by a milling adjuvant or dispersing agent comprising the steps of:

subjecting a water-soluble separand material into a physicochemical separation, said water-soluble separand material being selected from the group consisting of a vinyl polymer, a vinyl copolymer, an acrylic polymer, an acrylic copolymer, a polycondensate polymer and a polycondensate copolymer, by a technique of extraction, filtration, ultra filtration, nanofiltration or reverse osmosis, in a continuous or batch process, employing a separation apparatus, said apparatus comprising at least one organic or mineral membrane, said membrane being optionally borne on a support, wherein said water-soluble separand material has at least one acidic functional group;

separating said water-soluble separand into useful phases at least one of said phases corresponding to a milling adjuvant or dispersing agent.

DESCRIPTION OF THE PREFERRED EMBODIMENTS

The described method enables one to produce, surprisingly, a water-soluble milling adjuvant or dispersing agent which facilitates the production of an aqueous suspension of mineral particles intended for use in an application involving a pigment.

Another object of the present invention is the production, by means of the method of the invention, of a water-soluble milling adjuvant or dispersing agent which facilitates the production of an aqueous suspension of mineral particles intended for use in an application involving a pigment.

A further object of the invention is an aqueous suspension of mineral particles produced with the aid of the adjuvant or agent of the present invention; applications of such a suspension in the areas of a technology of: paper, paint and coating, plastic, ceramic, water treatment, drilling (such as use in muds), treatment of a synthetic textile, or any other application requiring the use of an aqueous suspension of mineral particles.

These objects are achieved by means of the inventive method of separation, into fractions, of a vinyl polymer or copolymer, an acrylic polymer or copolymer, or a polycondensate polymer or copolymer, by a technique of extraction, filtration, ultrafiltration, nanofiltration, or reverse osmosis, in an aqueous medium, an aqueous alcoholic medium, or a solvent medium.

Whereas the state of the art employs a technique of separating various fractions based on differences in partition coefficient of the fractions (resulting in differences in solubilities), the inventive method according to the present invention is distinguished in that it is based on the differences in hydrodynamic volume and (in some cases) on the interaction between a membrane and separand.

The term "hydrodynamic volume" is understood to mean the volume occupied by polymer molecules as a function of various physicochemical parameters of the medium which affect the passage of polymer chains through a membrane, and as a function of possible chemical treatment of a membrane, which treatment would be of a type which one skilled in the art would deem capable of influencing the separation conditions.

The inventive method enables a continuous or batch process of separation into various phases to be carried out in which a separand is in the fully acidic state, or partially neutralized, or fully neutralized, and which does not require a third solvent (either polar or non-polar).

The method of the invention of producing a milling adjuvant or dispersing agent, by physicochemical separation of a vinyl polymer or a copolymer, an acrylic polymer or a copolymer, a polycondensate polymer or a copolymer, by a technique of extraction, filtration, ultrafiltration, nanofiltration, or reverse osmosis, of a water-soluble separand, is characterized in that: it makes use of a separation apparatus comprising one or more organic or mineral membranes, which membranes may be borne on a support, whereby the said water-soluble separand is separated into various useful phases at least one of which phases corresponds to a milling adjuvant or a dispersing agent for producing an aqueous suspension of mineral particles intended for use in an application involving a pigment.

The term "useful phases" used here is understood to signify that phases not used as a milling adjuvant or dispersing agent may be usable in related or other technologies.

The described apparatus, comprised of
  at least one membrane, which may have any of various geometric configurations (e.g. conical or cylindrical), and
  optionally at least one support, which may have a geometric shape(s) identical to or different from that of the membrane, and
has pores, which may be symmetric or asymmetric. The membrane, which may be treated by an organic or mineral agent, may be of a type characterized as capillary, or conduit-shaped, or nozzle shaped, or spiral, having a diameter or a distance apart which may vary; or it may be configured as a flat surface, wherein the distance between a surface with another surface may vary. The membranes may be organized in parallel or in series, and may be subjected to constant or intermittent ultrasonic waves for purposes of unblocking them.

The inventive milling adjuvant or dispersing agent, obtained by the inventive separation method, is purified, and is characterized by a molecular weight distribution curve obtained by aqueous GPC (gel permeation chromatography) with refractometric detection, wherein, in the curve, the second inflection peak, corresponding to a shoulder, has an attenuation, with respect to the initial product, of at least 3% and preferably at least 10%.

Further, the inventive milling adjuvant or dispersing agent, obtained by the inventive separation method, is characterized in that the groups generating the acid function contained in the adjuvant or agent are partially or completely neutralized by one or more monovalent or polyvalent neutralizing agent, such as, in particular, sodium hydroxide, potassium hydroxide, ammonium hydroxide, lithium hydroxide, zinc hydroxide, calcium hydroxide, magnesium hydroxide, aluminum hydroxide, or a primary, secondary, or tertiary aliphatic amine, or a primary, secondary, or tertiary cyclic amine.

The aqueous suspension of mineral particles is characterized in that it contains 0.05–2% of one or more milling adjuvant or dispersing agent according to the invention.

The fraction of the water-soluble vinyl polymer or copolymer, acrylic polymer or copolymer, or polycondensate polymer or copolymer, which polymeric material is intended to be used as a milling adjuvant or dispersing agent to produce a suspension for use in a pigment technology, is generally obtained by separation from the polymer-containing solution obtained by a known method of polycondensation or radical polymerization, which method has been carried out in the presence of:
  a polymerization regulator such as, e.g., an organic compound based on a reducing moiety such as, in particular, a hydroxylamine, and
  a polymerization initiator such as a peroxide or a persalt, e.g. hydrogen peroxide, sodium persulfate, sodium hypophosphite, or hypophosphorous acid.

A monomer or comonomer employed is one or more of the following:
  the following acids: (meth)acrylic, itaconic, crotonic, fumaric, isocrotonic, aconitic, mesaconic, sinapic, undecylenic, angelic, canellic, hydroxyacrylic, or maleic anhydride; these acids being used in the acid form or partially or completely neutralized;
  cationic monomers, e.g. the following: dimethylaminoethyl (meth)acrylate, dimethyl diallylammonium chloride, 1-(methacrylamido)propyl-3-trimethylammonium chloride, and derivatives and mixtures of these;
  sulfone-type or sulfonate-type comonomers, of the type of acrylamidomethyl propyl sulfone or methallyl sulfonate; and
  comonomers such as: acrolein, acrylamide, acrylonitrile, esters of (meth)acrylic acid, vinylpyrrolidone, vinylcaprolactam, ethylene, propylene, isobutylene, diisobutylene, vinyl acetate, styrene, a-methylstyrene, and methyl vinyl ketone;
  the polymerization medium may comprise water, methanol, ethanol, propanol, isopropanol, a butanol or mixture of butanols, dimethylformamide, dimethyl sulfoxide, tetrahydrofuran, acetone, methyl ethyl ketone, ethyl acetate, butyl acetate, hexane, heptane, benzene, toluene, xylene, mercaptoethanol, tertdodecyl mercaptan, acetic acid, tartaric acid, lactic acid, citric acid, gluconic acid, glucoheptonic acid, 2-mercaptopropanoic acid, di-2-hydroxyethyl sulfide, halogenated solvents e.g. carbon tetrachloride, chloroform, or dichloromethane, and ethers of monopropylene glycol or of diethylene glycol, and mixtures of such ethers.

In the polymer solution being subjected to separation, the moieties generating an acid function on the polymers are in the acid state or partially neutralized. The neutralization (or further neutralization) may be affected by one or more monovalent or polyvalent neutralization agents, such as, in particular, sodium hydroxide, potassium hydroxide, ammonium hydroxide, lithium hydroxide, zinc hydroxide, calcium hydroxide, magnesium hydroxide, aluminum hydroxide, or a primary, secondary, or tertiary aliphatic amine, or a primary, secondary, or tertiary cyclic amine, etc., and possibly followed by distillation to remove a solvent other than water in the polymerization medium.

The polymer solution, which may or may not be aqueous and may or may not have undergone distillation, is then introduced into a vessel which may be equipped with means of thorough intermixing. The initial dry matter concentration of the solution subjected to mixing may be on the order of 20–50%, or the concentration of the dry matter may be reduced to 1.5–20% by dilution with water. The solution is then pumped to a separation system such as ultrafiltration, nanofiltration, or reverse osmosis, with or without back pressure in one or more passages, and with or without recycling. Temperatures in the separation system may be as high as 70° C. or even 150° C.

The configuration of the membrane used may be, e.g., flat, helical, capillary, or tubular, with a single module or a combination of a plurality of modules, which may or may not be isolated, and may be arranged in parallel or in series.

The membrane may be supported by a support having a matching or different configuration, and further the membrane may have its surface treated by various additives such as, e.g., polyphosphazene, quaternary polyvinylimidazole, quaternary polyethylene, Naflon, Solgel, or others.

The membrane is chosen so as to be capable of separating the polymer solution, in which the polymer is in the fully acidic state, or partially neutralized, or fully neutralized state, into various useful fractions one of which comprises the milling adjuvant or dispersing agent according to the invention for producing an aqueous suspension of mineral particles intended for use in a pigment technology.

The apparatus enables the inventive method to be carried out and also enables recovery of one of the fractions, e.g. the retentate, to be recycled to the initial vessel or to be mixed with the polymer for one or more additional passages through the separation apparatus.

A plurality of membranes of the same or different type may be employed. All of the phases produced may be recovered and employed as useful fractions.

The retentate corresponding to the inventive adjuvant or agent is purified and is characterized by a molecular weight distribution curve obtained by aqueous GPC (gel permeation chromatography) with refractometric detection, wherein, in the curve, the second inflection peak (corresponding to a shoulder) has an attenuation, with respect to the initial product, of at least 3% and preferably at least about 10%.

The phase containing the fraction of polymers or copolymers corresponding to the adjuvant or agent according to the invention may be employed in the form obtained as a liquid in solution, for use as a milling adjuvant for a mineral substance to be processed; or the above-mentioned phase may be subjected to any known means for isolating the vinyl polymers or copolymers, acrylic polymers or copolymers, or polycondensate polymers or copolymers, in the form of a fine powder which can be employed as a milling adjuvant.

In practice, the fine milling (fine comminution) of a mineral substance consists of grinding the mineral substance with a milling material to form very fine particles in an aqueous medium containing the milling adjuvant.

The substance to be milled is placed in an aqueous suspension. A milling material is added to the suspension, which milling material advantageously has a particle size distribution in the range 0.2–4.0 mm. The milling material is generally present in the form of particles of various types selected from a wide range of materials such as silicon dioxide, aluminum oxide, zirconium oxide, or mixtures of these, or a hard synthetic resin, steel, etc. An example of a composition of a milling material is disclosed in Fr. Pat. 2,203,681:

| zirconium oxide | 30–70 wt. % |
| aluminum oxide | 0.1–5 wt. % |
| silicon dioxide | 5–20 wt. %. |

Preferably, the milling material is added to the suspension in an amount such that its ratio (by weight) to the mineral substance to be milled is at least 2:1, and preferably is in the range 3:1 to 5:1.

The mixture of the suspension and the milling material is then subjected to mechanical agitation, of the type produced in a classical mill having microelements.

The milling adjuvant or dispersing agent of the invention is introduced to the mixture formed by the aqueous suspension of a mineral material to be milled and the milling material, in an amount of 0.05–2 wt. % of the adjuvant (based on the dry weight of the polymer comprising the adjuvant, and based on the dry weight of the mineral materials to be milled).

The time needed to achieve the desired fineness of the mineral substances being milled varies depending on the nature and quantity of the substances, and further depending on the means of agitation employed and the temperature of the medium during the milling.

The mineral substances to be milled may be of widely varying origins. E.g. they may comprise (natural or synthetic) calcium carbonate, dolomite, calcium sulfate, titanium dioxide, aluminum hydroxide, or silicates and aluminosilicates (e.g. kaolin, mica, talc, or bentonite); in general, they may comprise any mineral substances which require milling in order to be usable in a wide variety of applications such as coating of paper, pigmenting of paints and other coatings, filling of rubbers or synthetic resins, treating of synthetic textiles, treating of water, formulating of drilling muds, etc.

The use of the inventive milling adjuvant or dispersing agent facilitates the milling of a mineral material having a relatively large particle size, in aqueous suspension with a high concentration of dry matter, to produce a mineral material having a relatively fine particle size.

This application is based on the French application Fr. 94-15440 which is incorporated herewith by reference.

Having generally described this invention, a further understanding can be obtained by reference to certain specific examples which are provided herein for the purpose of illustration only and are not intended to be limiting unless otherwise specified.

EXAMPLES

Example 1

A milling adjuvant or dispersing agent according to the invention was obtained by separation of a sodium polyacrylate completely neutralized by sodium hydroxide. The separation employed a capillary membrane and was carried out at about 25° C. using various concentrations of dry matter. The product was then used as a milling adjuvant or dispersing agent.

Experiment No. 1

An aqueous solution containing 32% of completely neutralized sodium polyacrylate with weight average molecular weight $\overline{Mw}=6000$ (determined by aqueous GPC, using a standard comprising a series of sodium polyacrylates supplied by the firm Polymer Standards Service under the name "PSS-PAA", of molecular weights 2000 to 8000) was introduced to the separating apparatus by means of a pump delivering 144 L/hr. The apparatus employed a "UFP-5-E-6A" capillary membrane containing 170 capillaries, supplied by the firm Sempas.

After 6 hr of operation of the apparatus at a feed rate of 144 L/hr and a temperature of 24.3–25.1° C., entrance pressure 480–540 kPa, and exit pressure 20–100 kPa, the retentate, corresponding to a milling adjuvant or dispersing agent according to the invention, was a completely neutralized sodium polyacrylate in water at a concentration of 31.5% based on dry matter, the polyacrylate having weight average molecular weight $\overline{Mw}=6250$ (by aqueous GPC), and was characterized by a molecular weight distribution curve obtained by aqueous GPC with refractometric detection, wherein, in the curve, the second inflection peak had an attenuation, with respect to the initial product, of 3.8%; and the permeate was a completely neutralized sodium polyacrylate having a weight average molecular weight $\overline{Mw}$=3200 (by aqueous GPC), in water at a concentration of 29.2% based on dry matter.

Experiment No. 2

The same apparatus was used as in Experiment No. 1, and the same polyacrylate was fed, but diluted to a concentration of 10% (using water purified by reverse osmosis for the dilution).

The same standards were used for the GPC determination as were used in Example 1.

After 2 hr of operation of the apparatus at a feed rate of 950 L/hr and a temperature which increased progressively from 18.5 to 27.7° C., with entrance pressure which increased from 270 to 290 kPa, and exit pressure from 100 to 110 kPa, the retentate, corresponding to a milling adjuvant or dispersing agent according to the invention, was a completely neutralized sodium polyacrylate having a weight average molecular weight $\overline{Mw}$-6400 (by aqueous GPC), in water at a concentration of 10.2% based on dry matter, and was characterized by a molecular weight distribution curve obtained by aqueous GPC with refractometric detection, wherein, in the curve, the second inflection peak, corresponding to a shoulder, had an attenuation, with respect to the initial product, of 17.4%; and the permeate was a completely neutralized sodium polyacrylate having a weight average molecular weight $\overline{Mw}$-3000 (by aqueous GPC), in water at a concentration of 7.5% based an dry matter).

Experiment No. 3

The same apparatus was used as in Experiment No. 1, and the same polyacrylate was fed, but diluted to a concentration of 5% (using water purified by reverse osmosis for the dilution).

The same standards were used for the GPC determination as were used in Example 1.

After 5 hr of operation of the apparatus at a feed rate of 950 L/hr and a temperature which increased progressively from 17.7 to 27.7° C., with entrance pressure which changed from 270 to 200 kPa, and exit pressure from 110 to 90 kPa, the retentate, corresponding to a milling adjuvant or dispercing agent according to the invention, was a completely neutralized sodium polyacrylate having a weight average molecular weight $\overline{Mw}$=6500 (by aqueous GPC), in water at a concentration of 6.1% based on dry matter, and was characterized by a molecular weight distribution curve obtained by aqueous GPC with refractometric detection, where, in the curve, the second inflection peak, corresponding to a shoulder, had an attenuation, with respect to the initial product, of 13%; and the permeate was a completely neutralized sodium polyacrylate having a weight average molecular weight $\overline{Mw}$=2000 (by aqueous GPC), in water at a concentration of 3.0% based on dry matter.

Experiments Nos. 4 to 7

In each of these experiments, a suspension of calcium carbonate of large particle size was subjected to milling to produce a suspension of fine particle size.

The suspension of the coarse material was prepared from a natural calcium carbonate, using the following:

For Experiment No. 4, illustrating the prior art, a completely neutralized sodium polyacrylate of weight average molecular weight $\overline{Mw}$=6000 (by aqueous GPC), in water at a concentration of 32% based on dry matter, resulting from radical polymerization of acrylic acid, and corresponding to the product fed to the separating apparatus;

For Experiment No. 5, illustrating the invention, the 25 completely neutralized sodium polyacrylate from Experiment No. 1, having $\overline{Mw}$=6250;

For Experiment No. 6, illustrating the invention, the completely neutralized sodium polyacrylate from Experiment No. 2, having $\overline{Mw}$=6400;

For Experiment No. 7, illustrating the invention, the completely neutralized sodium polyacrylate from Experiment No. 3, having $\overline{Mw}$=6500.

For each of these experiments, an aqueous suspension of calcium carbonate from the Orgon deposit, in France, was prepared. The particle size of this material was less than 10 microns, and the dry matter content of the aqueous suspension was 76 wt. % based on the total weight of the suspension.

The milling adjuvant was introduced into the suspension in amounts indicated in the Table, infra, given in units of wt. % dry matter, based on the dry weight of the calcium carbonate to be milled.

The suspension was circulated in a "Dyno-Mill" mill having a fixed cylinder and a rotating impeller, with the milling material comprising spheres of corundum of diameter in the range 0.6–1.0 mm.

The total volume occupied by the milling material was 1150 cc, and its weight was 2900 g. The milling chamber had volume 1400 cc. The circumferential speed of the mill was 10 m/sec. The calcium carbonate suspension was recycled at a rate of 18 L/hr.

The output of the Dyno-Mill was equipped with a 200 micron screen separator, to provide means of separating the milling material from the final suspension.

The temperature of the experiments was maintained at about 60° C. during the milling.

At the end of the milling process (time $T_o$), a sample of the pigment suspension with 80% of the particles having particle size less than 1 micron was collected in a flask, and the viscosity of the suspension was measured with a type RVT Brookfield viscometer, at 20° C. and rotational speeds of 10 and 100 rpm with an adequate spindle.

After the suspension was allowed to rest 8 days in the flask, a suitable spindle for the type RVT Brookfield viscometer was introduced into the flask, which had not been agitated, and the viscosity was measured at 20° C. and speeds 10 and 100 rpm (code "AVAG"=before agitation).

The viscosity was again measured after agitation of the flask, to provide a value after agitation (code "APAG").

The experimental results are presented in Table 1.

It is seen from Table 1 that, independently of the dry matter concentration of the polymer to be fractionated, the separation with the aid of a capillary membrane enables one to obtain a milling adjuvant or dispersing agent according to the invention which adjuvant or agent has a molecular weight distribution curve obtained by aqueous GPC with refractometric detection, where, in the curve, the second inflection peak, corresponding to a shoulder, has an attenuation, with respect to the initial product, of at least 3.8%.

TABLE 1

| | | Milling Adjuvant Used | | | | Brookfield Viscosity of the Suspension (mPa-sec), at 20° C. and 76% dry matter | | | | | |
|---|---|---|---|---|---|---|---|---|---|---|---|
| | Neutralization | | Attenuation | | Consumption | | | | | | |
| Experiment No. | for Separation (% and ion used) | Mw | in second inflection peak of GPC curve (%) | Dry Matter (%) | of milling adjuvant (% on dry matter basis) | $T_o$ and 10 rpm | $T_o$ 100 T/min | 8 days AVAG, 10 rpm | 8 days AVAG 100 T/min | 8 days APAG, at 10 rpm | 8 days APAG 100 T/min |
| Prior Art 4 | 100 Na | 6000 | 0 | 32 | 0.95 | 2000 | 640 | 33800 | 4500 | 15700 | 3230 |
| Invention 5 | 100 Na | 6250 | 3.8 | 31.5 | 0.82 | 650 | 230 | 6150 | 500 | 1250 | 250 |
| Invention 6 | 100 Na | 6400 | 17.4 | 10.2 | 0.94 | 2000 | 770 | 23400 | 4100 | 7650 | 1930 |
| Invention 7 | 100 Na | 6500 | 13.0 | 6.1 | 0.92 | 1530 | 520 | 25480 | 3800 | 6560 | 1600 |

AVAG: Measure of the viscosity prior to agitation of the suspension
APAG: Measure of the viscosity after agitation It is also seen from Table 1 that the milling adjuvant or dispersing agent according to the invention enables production, of an aqueous suspension of calcium carbonate which is highly concentrated and which nonetheless has a Brookfield viscosity which is lower than that of prior art suspensions, at an adequate speed of rotation of the spindle, namely on the order of 10 rpm, after 8 days without agitation. In practice, this result translates into improved pumpability of the suspension after being stored several days in a non-agitated vessel.

Example 2

In this Example, a milling adjuvant or dispersing agent according to the invention was obtained by separation of a mixed sodium and calcium polyacrylate completely neutralized by sodium hydroxide and calcium hydroxide. The separation employed a capillary membrane and was carried out at a temperature varying from 17 to 28° C. The product was then used as a milling adjuvant or dispersing agent.

Experiment No. 8

An aqueous solution containing 32% of polyacrylate completely neutralized by a mixture comprised of 76% sodium hydroxide and 24% calcium hydroxide, the polyacrylate having a weight average molecular weight $M\overline{w}$=6000 (determined by aqueous GPC), was diluted to 10% using water purified by reverse osmosis, and was then subjected to separation on the same apparatus as in Experiment No. 1, under the conditions described below.

The same standards were used for the GPC determination as were used in Example 1.

After 2 hr of operation of the apparatus at a feed rate of 1000 L/hr and a temperature which increased progressively from 17 to 28∞ C., with entrance pressure which decreased from 280 to 260 kPa (meanwhile passing through a maximum of 300 kPa), and exit pressure increasing from 100 to 120 kPa, the retentate, corresponding to a milling adjuvant or dispersing agent according to the invention, was a completely neutralized sodium-calcium (mixed) polyacrylate having a weight average molecular weight $M\overline{w}$=6200 (by aqueous GPC), in water at a concentration of 10.6% based on dry matter, and was characterized by a molecular weight distribution curve obtained by aqueous GPC with refractometric detection, wherein (in the curve) the second inflection peak (corresponding to a shoulder) had an attenuation, with respect to the initial product, of 3.8%; and the permeate was a completely neutralized sodium-calcium (mixed) polyacrylate having a weight average molecular weight $M\overline{w}$=1570 (by aqueous GPC), in water at a concentration of 5.1% based on dry matter.

Experiments Nos. 9 comparison and 10

In these Experiments, a suspension of calcium carbonate of relatively large particle size was subjected to milling to produce a suspension of microparticles.

The suspension of calcium carbonate of relatively large particle size was prepared from a calcium carbonate, using the following:

For Experiment No. 9, illustrating the prior art, a completely neutralized sodium-calcium (mixed) polyacrylate having a weight average molecular weight M$\overline{w}$=6000 (by aqueous GPC), resulting from radical polymerization of acrylic acid and corresponding to the material fed to the separation apparatus;

For Experiment No. 10, illustrating the invention, the completely neutralized sodium-calcium (mixed) polyacrylate of Experiment No. 8, having a weight average molecular weight $M\overline{w}$=6200.

For Experiments Nos. 9 and 10, the aqueous suspension of calcium carbonate was prepared and milled with the same apparatus and under the same operating conditions as in Experiments Nos. 4–7.

The experimental results are presented in Table 2.

It is seen from Table 2 that the separation, with the aid of a capillary membrane, of the fractions of the polyacrylate completely neutralized by a mixture of sodium hydroxide and calcium hydroxide enables one to obtain a milling adjuvant or dispersing agent according to the invention which adjuvant or agent has a molecular weight distribution curve obtained by aqueous GPC with refractometric detection, wherein (in the curve) the second inflection peak, corresponding to a shoulder, has an attenuation, with respect to the initial product, of at least 3.8%.

TABLE 2

| | | Milling Adjuvant Used | | | | Brookfield Viscosity of the Suspension (mPa-sec), at 20° C. and 76% dry matter | | | | | |
|---|---|---|---|---|---|---|---|---|---|---|---|
| | | Neutralization | Attenuation | | | Consumption | | | | | |
| | Experiment No. | for Separation (% and ion used) | Mw | in second inflection peak of GPC curve (%) | Dry Matter (%) | of milling adjuvant (% on dry matter basis) | $T_o$ and 10 rpm | $T_o$ 100 T/min | 8 days AVAG, 10 rpm | 8 days AVAG 100 T/min | 8 days APAG, 100 at 10 rpm | 8 days APAG 100 T/min |
| Prior Art | 9 | 76 Na/24 Ca | 6000 | 0 | 32 | 1.05 | 1300 | 430 | 5710 | 1100 | 1100 | 360 |
| Invention | 10 | 76 Na/24 Ca | 6200 | 3.8 | 10.6 | 1.05 | 1300 | 420 | 3730 | 980 | 1100 | 360 |

AVAG: Measure of the viscosity prior to agitation of the suspension
APAG: Measure of the viscosity after agitation It is also seen from Table 2 that the inventive milling adjuvant or dispersing agent according to the invention enables production of an aqueous suspension of calcium carbonate which is highly concentrated and which, nonetheless, has a Brookfield viscosity which is lower than that of prior art suspensions, at an adequate speed of rotation of the spindle, namely in the order of 10 rpm, after 8 days without agitation. In practice, this result translates into improved pumpability of the suspension after being stored several days in a non-agitated vessel.

Example 3

In this Example, a milling adjuvant or dispersing agent according to the invention was obtained by separation of a sodium polyacrylate partially neutralized (to the extent of 50%) by sodium hydroxide. The separation employed a capillary membrane and was carried out at a temperature varying from 18 to 28° C. The product was then used as a milling adjuvant or dispersing agent.

Experiment No. 11

An aqueous solution containing 29% of polyacrylate partially neutralized (to the extent of 50%) by sodium hydroxide, the above polyacrylate having a weight average molecular weight $\overline{Mw}$=6000 (determined by aqueous GPC), was diluted to 10% using water purified by reverse osmosis, and was then subjected to separation on the same apparatus as in Experiment No. 1, under the conditions described below.

The same standards were used for the GPC determination as were used in Example 1.

After 2 hr of operation of the apparatus at a feed rate of 1000 L/hr and a temperature which increased progressively from 18 to 28° C., with entrance pressure which decreased from 310 to 300 kPa (meanwhile passing through a maximum of 320 kPa), and exit pressure increasing from 100 to 110 kPa, the retentate, corresponding to a milling adjuvant or dispersing agent according to the invention, was a sodium polyacrylate, partially neutralized (to the extent of 50%), having a weight average molecular weight $\overline{Mw}$=6070 (by aqueous GPC), in water at a concentration of 10.1% based on dry matter, and was characterized by a molecular weight distribution curve obtained by aqueous GPC with refractometric detection, wherein (in the curve) the second inflection peak (corresponding to a shoulder) had an attenuation, with respect to the initial product, of 9.9%; and the permeate was a sodium polyacrylate, partially neutralized (to the extent of 50%), having a weight average molecular weight $\overline{Mw}$=2500 (by aqueous GPC), in water at a concentration of 6.9% based on dry matter.

Experiments Nos. 12 (comparative) and 13

In these Experiments, a suspension of calcium carbonate of relatively large particle size was subjected to milling to produce a suspension of microparticles.

The suspension of calcium carbonate of relatively large particle size was prepared from a natural calcium carbonate, using the following:

For Experiment No. 12, illustrating the prior art, a sodium polyacrylate, partially neutralized (to the extent of 50%), having a weight average molecular weight $\overline{Mw}$=6000 (by aqueous GPC), resulting from radical polymerization of acrylic acid and corresponding to the material fed to the separation apparatus, except that for the present test the material was neutralized to the extent of 100% with sodium hydroxide;

For Experiment No. 13, illustrating the invention, the sodium polyacrylate, partially neutralized (to the extent of 50%), of Experiment No. 11, having a weight average molecular weight $\overline{Mw}$=6070, except that for the present test the material was neutralized to the extent of 100% with sodium hydroxide after the separation.

For Experiments Nos. 12 and 13, the aqueous suspension of calcium carbonate was prepared and milled with the same apparatus and under the same operating conditions as in Experiments Nos. 4–7.

The experimental results are presented in Table 3.

TABLE 3

| | Milling Adjuvant Used | | | | Brookfield Viscosity of the Suspension | | | | | |
|---|---|---|---|---|---|---|---|---|---|---|
| | Neutralization | Attenuation | | | Consumption | (mPa-sec), at 20° C. and 76% dry matter | | | | |
| Experiment No. | for Separation (% and ion used) | Mw | in second inflection peak of GPC curve (%) | Dry Matter (%) | of milling adjuvant (% on dry matter basis) | $T_o$ and 10 rpm | $T_o$ 100 T/min | 8 days AVAG, 10 rpm | 8 days AVAG 100 T/min | 8 days APAG, at 10 rpm | 8 days APAG 100 T/min |
| Prior Art 12 | 50 Na | 6000 | 0 | 29 | 0.97 | 1760 | 660 | 25720 | 2370 | 10770 | 2600 |
| Invention 13 | 50 Na | 6070 | 9.9 | 10.1 | 0.87 | 930 | 350 | 12930 | 2370 | 2070 | 670 |

AVAG: Measure of the viscosity prior to agitation of the suspension
APAG: Measure of the viscosity after agitation It is seen from Table 3 that the separation, with the aid of a capillary membrane, of the fractions of the polyacrylate, partially neutralized (to the extent of 50%) by sodium hydroxide, enables one to obtain a milling adjuvant or dispersing agent according to the invention, which adjuvant or agent has a molecular weight distribution curve obtained by aqueous GPC with refractometric detection, wherein (in the curve) the second inflection peak, corresponding to a shoulder, has an attenuation, with respect to the initial product, of at least 9.9%.

It is also seen from Table 3 that the inventive milling adjuvant or dispersing agent according to the invention enables production of an aqueous suspension of calcium carbonate which is highly concentrated and is more stable than those according to prior art.

Example 4

In this Example, a milling adjuvant or dispersing agent according to the invention was obtained by separation of a sodium polyacrylate partially neutralized (to the extent of 5%) by sodium hydroxide. The separation employed a capillary membrane and was carried out at a temperature varying from 19 to 31° C. The product was then used as a milling adjuvant or dispersing agent.

Experiment No. 14

An aqueous solution containing 26.3% of polyacrylate partially neutralized (to the extent of 5%) by sodium hydroxide, the above polyacrylate having a weight average molecular weight $\overline{Mw}$=6000 (determined by aqueous GPC), was diluted to 10% using water purified by reverse osmosis, and was then subjected to separation on the same apparatus as in Experiment No. 1, under the conditions described below.

The same standards were used for the GPC determination as were used in Example 1.

After 2.5 hr of operation of the apparatus at a feed rate of 975 L/hr and a temperature which increased progressively from 19.3 to 30.8° C., with entrance pressure which increased from 380 to 400 kPa, and exit pressure which increased from 80 to 110 kPa, the retentate, corresponding to a milling adjuvant or dispersing agent according to the invention, was a sodium polyacrylate, partially neutralized (to the extent of 5%), having dry matter 10.9%, and a weight average molecular weight $\overline{Mw}$=6050 (by aqueous GPC), and was characterized by a molecular weight distribution curve obtained by aqueous GPC with refractometric detection, wherein (in the curve) the second inflection peak (corresponding to a shoulder) had an attenuation, with respect to the initial product, of 3.5%; and the permeate was a sodium polyacrylate, partially neutralized (to the extent of 5%), having a weight average molecular weight $\overline{Mw}$=2130 (by aqueous GPC), in water at a concentration of 5.0% based on dry matter.

Experiment No. 15

In this Experiment, which illustrates the invention, a suspension of calcium carbonate of relatively large particle size was subjected to milling to produce a suspension of microparticles.

The suspension of calcium carbonate of relatively large particle size was prepared from a natural calcium carbonate, using the sodium polyacrylate, partially neutralized (to the extent of 5%), of Experiment No. 14, having a weight average molecular weight $\overline{Mw}$=6050, except that for the present test the material was neutralized to the extent of 100% with sodium hydroxide after the separation.

For Experiment No. 15, the aqueous suspension of calcium carbonate was prepared and milled with the same apparatus and under the same operating conditions as in Experiments Nos. 4–7.

The experimental results are presented in Table 4.

TABLE 4

| | Milling Adjuvant Used | | | | Brookfield Viscosity of the Suspension | | | | | |
|---|---|---|---|---|---|---|---|---|---|---|
| | Neutralization | Attenuation | | | Consumption | (mPa-sec), at 20° C. and 76% dry matter | | | | |
| Experiment No. | for Separation (% and ion used) | Mw | in second inflection peak of GPC curve (%) | Dry Matter (%) | of milling adjuvant (% on dry matter basis) | $T_o$ and 10 rpm | $T_o$ 100 T/min | 8 days AVAG, 10 rpm | 8 days AVAG 100 T/min | 8 days APAG, at 10 rpm | 8 days APAG 100 T/min |
| Invention 15 | 5 Na | 6050 | 3.5 | 10.9 | 0.93 | 1300 | 470 | 21850 | 3590 | 5630 | 1650 |

AVAG: Measure of the viscosity prior to agitation of the suspension
APAG: Measure of the viscosity after agitation It is seen from Table 4 that the separation, with the aid of a capillary membrane, of the fractions of the polyacrylate, partially neutralized (to the extent of 5%) by sodium hydroxide, enables one to obtain a milling adjuvant or dispersing agent according to the invention which adjuvant or agent has a molecular weight distribution curve obtained by aqueous GPC with refractometric detection, wherein (in the curve) the second inflection peak, corresponding to a shoulder, has an attenuation, with respect to the initial product, of at least 3.5%.

It is also seen from Table 4 that the milling adjuvant or dispersing agent according to the invention enables production of an aqueous suspension of calcium carbonate which is highly concentrated, whereas no prior art method of separation enables production, at 5% neutralization, of a milling adjuvant or dispersing agent.

Example 5

In this Example, a milling adjuvant or dispersing agent according to the invention was obtained by separation of a polyacrylic acid, with the aid of a capillary membrane, at a temperature varying from 20.2 to 32.8° C. The product was then used as a milling adjuvant or dispersing agent.

The suspension of calcium carbonate of relatively large particle size was prepared from a natural calcium carbonate, using the following:

For Experiment No. 17, illustrating the prior art, a polyacrylic acid having a weight average molecular weight $\overline{Mw}$=4500 (by aqueous GPC), resulting from radical polymerization of acrylic acid and corresponding to the material fed to the separation apparatus, except that for the present test the material was neutralized to the extent of 100% with sodium hydroxide;

For Experiment No. 18, illustrating the invention, the polyacrylic acid of Experiment No. 16, having a weight average molecular weight $\overline{Mw}$=4600, except that for the present test the material was neutralized to the extent of 100% with sodium hydroxide after the separation.

For Experiments Nos. 17 and 18, the aqueous suspension of calcium carbonate was prepared and milled with the same apparatus and under the same operating conditions as in Experiments Nos. 4–7.

The experimental results are presented in Table 5.

TABLE 5

| | | Milling Adjuvant Used | | | | Brookfield Viscosity of the Suspension | | | | | |
|---|---|---|---|---|---|---|---|---|---|---|---|
| | | Neutralization | | Attenuation | | Consumption | (mPa-sec), at 20° C. and 76% dry matter | | | | |
| | Experiment No. | for Separation (% and ion used) | Mw | in second inflection peak of GPC curve (%) | Dry Matter (%) | of milling adjuvant (% on dry matter basis) | $T_o$ and 10 rpm | $T_o$ 100 T/min | 8 days AVAG, 10 rpm | 8 days AVAG 100 T/min | 8 days APAG, at 10 rpm | 8 days APAG 100 T/min |
| Prior Art | 17 | 0 | 4500 | 0 | 24.7% | 1.08 | 1400 | 400 | 2030 | 650 | 1120 | 330 |
| Invention | 18 | 0 | 4600 | 8.2 | 17.5% | 1.08 | 1400 | 400 | 1900 | 640 | 850 | 280 |

AVAG: Measure of the viscosity prior to agitation of the suspension
APAG: Measure of the viscosity after agitation Experiment No. 16

An aqueous solution containing 24.7% of polyacrylic acid, having a weight average molecular weight $\overline{Mw}$=4500 (determined by aqueous GPC), was diluted to 15% with water, and was then subjected to separation on the same apparatus as in Experiment No. 1, under the conditions described below.

The same standards were used for the GPC determination as were used in Example 1.

After 22 hr of operation of the apparatus at a feed rate of 1200 L/hr and a temperature which varied from 20.2 to 32.8° C., with entrance pressure which increased from 150 to 320 kPa and exit pressure which increased from 50 to 160 kPa, the retentate, corresponding to a milling adjuvant or dispersing agent according to the invention, was a polyacrylic acid having a weight average molecular weight $\overline{Mw}$=4600 (by aqueous GPC), in water at a concentration of 17.5% based on dry matter, and was characterized by a molecular weight distribution curve obtained by aqueous GPC with refractometric detection, wherein (in the curve) the second inflection peak (corresponding to a shoulder) had an attenuation, with respect to the initial product, of 8.2%; and the permeate was a polyacrylic acid having a weight average molecular weight $\overline{Mw}$=2200 (by aqueous GPC), in water at a concentration of 6.0% based on dry matter.

Experiments Nos. 17 (comparative) and 18

In these Experiments, a suspension of calcium carbonate of relatively large particle size was subjected to milling to produce a suspension of microparticles.

It is seen from Table 5 that the separation, with the aid of a capillary membrane, of the fractions of the polyacrylic acid enables one to obtain a milling adjuvant or dispersing agent according to the invention which adjuvant or agent has a molecular weight distribution curve obtained by aqueous GPC with refractometric detection, wherein (in said curve) the second inflection peak, corresponding to a shoulder, has an attenuation, with respect to the initial product, of at least 8.2%.

It is also seen from Table 5 that the milling adjuvant or dispersing agent according to the invention enables production of an aqueous suspension of calcium carbonate which is at least as stable as suspensions produced with non-separated products according to the state of the art; further, that no prior art method of separation enables production of a milling adjuvant or dispersing agent in a completely acid state.

Example 6

A milling adjuvant or dispersing agent according to the invention was obtained by separation of a sodium polyacrylate completely neutralized by sodium hydroxide. The separation employed a system of a plurality of nanofiltration membranes of flat or tubular configuration, mounted in series, and was carried out at about 68° C. The product was then used as a milling adjuvant or dispersing agent.

Experiment No. 19

An aqueous solution containing 24.5% of sodium polyacrylate, which polyacrylate had been completely neutralized with sodium hydroxide and had a weight average molecular weight $\overline{Mw}$=5160 (determined by aqueous GPC) was fed at 400 L/hr, by means of a "Moineau" circulating pump, to the system of membranes firmly mounted on a carbon support, which membranes had been surface-treated by quaternized polyethylene imine. The surface area of the membranes was 0.0113 sq m.

The same standards were used for the GPC determination as were used in Example 1.

After 7 hr 30 min of operation of the apparatus at 68° C. and a pressure of 3000 kPa, the retentate, corresponding to a milling adjuvant or dispersing agent according to the invention, was a completely neutralized sodium polyacrylate having a weight average molecular weight $\overline{Mw}$=5520 (by aqueous GPC), in water at a concentration of 22% based on dry matter, and was characterized by a molecular weight distribution curve obtained by aqueous GPC with refractometric detection, wherein (in the curve) the second inflection peak, corresponding to a shoulder, had an attenuation, with respect to the initial product, of at least 15.0%; and the permeate was a completely neutralized sodium polyacrylate having a weight average molecular weight $\overline{Mw}$=2430 (by aqueous GPC), in water at a concentration of 6.5% based on dry matter.

Experiments Nos. 20 (comparative) and 21

In these Experiments, a suspension of calcium carbonate of relatively large particle size was subjected to milling to produce a suspension of microparticles.

The suspension of the coarse material was prepared from a natural calcium carbonate, using the following:

For Experiment No. 20, illustrating the prior art, a completely neutralized sodium polyacrylate of a weight average molecular weight $\overline{Mw}$=5160 (by aqueous GPC), resulting from radical polymerization of acrylic acid, and corresponding to the product fed to the separating apparatus;

For Experiment No. 21, illustrating the invention, the completely neutralized sodium polyacrylate from Experiment No. 19, having $\overline{Mw}$=5520.

For Experiments Nos. 20 and 21, the aqueous suspension of calcium carbonate was prepared and milled with the same apparatus and under the same operating conditions as in Experiments Nos. 4–7.

The experimental results are presented in Table 6.

dispersing agent according to the invention which adjuvant or agent has a molecular weight distribution curve obtained by aqueous GPC with refractometric detection, wherein (in the curve) the second inflection peak, corresponding to a shoulder, has an attenuation, with respect to the initial product, of at least 15.0%.

It is also seen from Table 6 that the inventive milling adjuvant or dispersing agent according to the invention enables production of an aqueous suspension of calcium carbonate which are highly concentrated and are more stable than those obtained with a non-separated milling adjuvant according to the prior art.

Example 7

A milling adjuvant or dispersing agent according to the invention was obtained by separation, with a "Carbosep® M5" membrane based on carbon and zirconium, of a copolymer completely neutralized by sodium hydroxide. The separation was carried out at a temperature in the order of 25° C. The product was then used as a milling adjuvant or dispersing agent.

Experiment No. 22

An aqueous solution containing 30% of copolymer based on dry matter, which copolymer had been completely neutralized with sodium hydroxide, was comprised of 97 wt. % of acrylic acid monomer (based on the total weight of monomers) and 3 wt. % of acrylamidomethylpropanesulfonic acid (AMPS) (based on the total weight of monomers), had a weight average molecular weight $\overline{Mw}$=4700 (determined by aqueous GPC), and had been diluted to 2% by water purified by reverse osmosis, was introduced to the separating apparatus at a feed rate of 8 L/hr per sq m of membrane, at a temperature of 25° C. and pressure 100 kPa.

The retentate obtained, corresponding to a milling adjuvant or dispersing agent according to the invention, was a completely neutralized copolymer of acrylic acid and AMPS, having a weight average molecular weight $\overline{Mw}$=4950 (by aqueous GPC), in water at a concentration of 1.6% based on dry matter, and was characterized by a molecular weight distribution curve obtained by aqueous GPC with refractometric detection, wherein (in the curve)

TABLE 6

| | | Milling Adjuvant Used | | | | Brookfield Viscosity of the Suspension | | | | | |
|---|---|---|---|---|---|---|---|---|---|---|---|
| | | Neutralization | | Attenuation | | Consumption | (mPa-sec), at 20° C. and 76% dry matter | | | | |
| | Experiment No. | for Separation (% and ion used) | Mw | in second inflection peak of GPC curve (%) | Dry Matter (%) | of milling adjuvant (% on dry matter basis) | $T_o$ and 10 rpm | $T_o$ 100 T/min | 8 days AVAG, 10 rpm | 8 days AVAG 100 T/min | 8 days APAG, at 10 rpm | 8 days APAG 100 T/min |
| Prior Art | 20 | 100 Na | 5160 | 0 | 24.5 | 0.97 | 1275 | 500 | 40000 | 5000 | 7100 | 2050 |
| Invention | 21 | 100 Na | 5520 | 15.0 | 22 | 0.9 | 1050 | 380 | 3200 | 2620 | 1350 | 500 |

AVAG: Measure of the viscosity prior to agitation of the suspension
APAG: Measure of the viscosity after agitation It is seen from Table 6 that the separation—with the aid of a system of membranes on a carbon support, which are surface-treated with polyethylene imine—of the fractions of the polyacrylate, completely neutralized by sodium hydroxide, enables one to obtain a milling adjuvant or the second inflection peak had an attenuation, with respect to the initial product, of 6.0%; and the permeate was a completely neutralized copolymer of acrylic acid and AMPS, having a weight average molecular weight $\overline{Mw}$=1000 (by aqueous GPC), in water at a concentration of 0.6% based on dry matter.

Experiments Nos. 23 (comparison) and 24

In these Experiments, a suspension of calcium carbonate of relatively large particle size was subjected to milling to produce a suspension of microparticles.

The suspension of the coarse material was prepared from a natural calcium carbonate, using the following:

For Experiment No. 23, illustrating the prior art, a completely neutralized copolymer of acrylic acid and AMPS, of a weight average molecular weight $\overline{Mw}=4700$ (by aqueous GPC), in a water at a concentration of 30% based on dry matter, the above copolymer resulting from radical copolymerization of acrylic acid and AMPS, and corresponding to the product fed to the separating apparatus;

For Experiment No. 24, illustrating the invention, the copolymer from Experiment No. 22, completely neutralized by sodium hydroxide.

For Experiments Nos. 23 and 24, the aqueous suspension of calcium carbonate was prepared and milled with the same apparatus and under the same operating conditions as in Experiments Nos. 4–7.

The experimental results are presented in Table 7.

with a mixture comprised of 60% sodium hydroxide and 40% magnesium hydroxide, had a weight average molecular weight $\overline{Mw}=5160$ (determined by aqueous GPC), and had been diluted to 2% by water purified by reverse osmosis, was subjected to separation of fractions, using the same equipment and operating conditions as in Experiment No. 22.

The retentate obtained, corresponding to a milling adjuvant or dispersing agent according to the invention, was a polyacrylate completely neutralized by a mixture of sodium hydroxide and magnesium hydroxide, which polyacrylate had a weight average molecular weight $\overline{Mw}=5400$ (by aqueous GPC), in water at a concentration of 1.6% based on dry matter, and was characterized by a molecular weight distribution curve obtained by aqueous GPC with refractometric detection, wherein (in the curve) the second inflection peak had an attenuation, with respect to the initial product, of 6.0%; and the permeate was a polyacrylate completely neutralized by a mixture of sodium hydroxide and magnesium hydroxide, which polyacrylate had a weight average molecular weight $\overline{Mw}=2000$ (by aqueous GPC), in water at a concentration of 0.6% based on dry matter.

TABLE 7

| | | Milling Adjuvant Used | | | | Brookfield Viscosity of the Suspension | | | | | |
| | | | | | | (mPa-sec), at 20° C. and 76% dry matter | | | | | |
| | | Neutralization | Attenuation | | Consumption | | | | | | |
| | Experiment No. | for Separation (% and ion used) | Mw | in second inflection peak of GPC curve (%) | Dry Matter (%) | of milling adjuvant (% on dry matter basis) | $T_o$ and 10 rpm | $T_o$ 100 T/min | 8 days AVAG, 10 rpm | 8 days AVAG 100 T/min | 8 days APAG, at 10 rpm | 8 days APAG 100 T/min |
|---|---|---|---|---|---|---|---|---|---|---|---|---|
| Prior Art | 23 | 100 Na | 4700 | 0 | 30 | 0.98 | 3720 | 980 | 47000 | 6460 | 19580 | 4700 |
| Invention | 24 | 100 Na | 4950 | 6.0 | 1.6 | 0.93 | 1200 | 350 | 15000 | 2200 | 9800 | 2350 |

AVAG: Measure of the viscosity prior to agitation of the suspension
APAG: Measure of the viscosity after agitation It is seen from Table 7 that the separation, with the aid of a Carbosep® M5 membrane, of the fractions of the copolymer of acrylic acid and AMPS, which has been completely neutralized by sodium hydroxide, enables one to obtain a milling adjuvant or dispersing agent according to the invention which adjuvant or agent has a molecular weight distribution curve obtained by aqueous GPC with refractometric detection, wherein (in the curve) the second inflection peak, corresponding to a shoulder, has an attenuation, with respect to the initial product, of at least 6%.

It is also seen from Table 7 that the milling adjuvant or dispersing agent according to the invention enables production of an aqueous suspension of calcium carbonate which is highly concentrated and is more stable than those according to the prior art.

Example 8

A milling adjuvant or dispersing agent according to the invention was obtained by separation, with the aid of the membrane employed in Example 7, of a polymer completely neutralized by a mixture of sodium hydroxide and magnesium hydroxide. The separation was carried out at a temperature in the order of 25° C. The product was then used as a milling adjuvant or dispersing agent.

Experiment No. 25

An aqueous solution containing 31% of a polyacrylate based on dry matter, which had been completely neutralized Experiments Nos. 26 comparison and 27

In these Experiments, a suspension of calcium carbonate of relatively large particle size was subjected to milling to produce a suspension of microparticles.

The suspension of the coarse material was prepared from a natural calcium carbonate, using the following:

For Experiment No. 26, illustrating the prior art, a polyacrylate which had been completely neutralized with a mixture comprised of 60% sodium hydroxide and 40% magnesium hydroxide, had a weight average molecular weight $\overline{Mw}=5160$ (determined by aqueous GPC), in water at a concentration of 31.0% based on dry matter, the above polyacrylate resulting from radical polymerization of acrylic acid, and corresponding to the product fed to the separating apparatus;

For Experiment No. 27, illustrating the invention, the polyacrylate from Experiment No. 25.

For Experiments Nos. 26 and 27, the aqueous suspension of calcium carbonate was prepared and milled with the same apparatus and under the same operating conditions as in Experiments Nos. 4–7.

The experimental results are presented in Table 8.

TABLE 8

| | Milling Adjuvant Used | | | | Brookfield Viscosity of the Suspension | | | | | |
|---|---|---|---|---|---|---|---|---|---|---|
| | Neutralization | Attenuation | | | Consumption | (mPa-sec), at 20° C. and 76% dry matter | | | | |
| Experiment No. | for Separation (% and ion used) | Mw | in second inflection peak of GPC curve (%) | Dry Matter (%) | of milling adjuvant (% on dry matter basis) | $T_o$ and 10 rpm | $T_o$ 100 T/min | 8 days AVAG, 10 rpm | 8 days AVAG 100 T/min | 8 days APAG, at 10 rpm | 8 days APAG 100 T/min |
| Prior Art 26 | 60 Na/40 Mg | 5160 | 0 | 31.0 | 1.15 | 1500 | 480 | 3400 | 880 | 1300 | 380 |
| Invention 27 | 60 Na/40 Mg | 5400 | 6.0 | 1.6 | 1.11 | 1350 | 400 | 2000 | 580 | 1030 | 290 |

AVAG: Measure of the viscosity prior to agitation of the suspension
APAG: Measure of the viscosity after agitation It is seen from Table 8 that the separation, with the aid of a Carbosep® M5 membrane, of the fractions of the polyacrylate which polyacrylate has been completely neutralized by a mixture of sodium hydroxide and magnesium hydroxide, enables one to obtain a milling adjuvant or dispersing agent according to the invention which adjuvant or agent has a molecular weight distribution curve obtained by aqueous GPC with refractometric detection, wherein (in the curve) the second inflection peak, corresponding to a shoulder, has an attenuation, with respect to the initial product, of at least 6.0%.

It is also seen from Table 8 that the milling adjuvant or dispersing agent according to the invention enables production of an aqueous suspension of calcium carbonate which is highly concentrated and is more stable than those according to the prior art.

Although the present invention has been described with reference to specific details of certain embodiments thereof, it is not intended that such details should be regarded as limitations upon the scope of the invention except insofar as they are included in the accompanying claims.

Example 9

This example relates to the obtaining of a milling adjuvant or dispersing agent in accordance with the invention by separation with the aid of a capillary membrane, at a temperature ranging from 20° C. to 33° C., of an acrylic and methacrylamide acid copolymer 50% partially neutralized by soda, as well as its use as a milling adjuvant or dispersing agent.

Test No. 28

For this purpose, an aqueous solution with 29.4% dry-matter concentration of an acrylic and methacrylamide acid copolymer 50% partially neutralized by soda, of a weight average molecular weight $\overline{Mw}$=5350 determined by aqueous GPC, was diluted 10% with water purified by reverse osmosis then separated with the same apparatus as that for test No. 1 and under the conditions described below.

For the GPC measurements, the same standards as those for example 1 are applied.

After 7 hours of operation of the device at a feed rate ranging from 700 to 1200 1/h with a temperature gradually increasing from 20.6° C. to 33.5° C. and a pressure at intake on the order of $2,5.10^5$ Pa and at outlet on the order of $1, 3. 10^5$ Pa, the retained material collected, corresponding to the milling adjuvant or dispersing agent according to the invention, is an acrylic-methacrylamide acid copolymer 50% partially neutralized by soda having a dry-matter content of 10.0%, a weight average molecular weight $\overline{Mw}$=6100 determined by aqueous GPC and is characterized by a molecular-weight distribution curve obtained by aqueous GPC and refractometric detection showing a decrease of 6.8% with respect to the initial product, in the second curvature peak corresponding to a shoulder when the permeate is a 50% partially-neutralized copolymer having a dry-matter content of 7.6% and a weight average molecular weight $\overline{Mw}$=2900 determined by aqueous GPC.

Test No. 29 and No. 30

These tests relate to the preparation of a coarse calcium carbonate suspension subjected to a milling in order to refine it to a microparticulate suspension.

For this purpose, a coarse calcium carbonate suspension was prepared from a natural calcium carbonate by making use of:

- for test No. 29 illustrating the prior art, an acrylic-methacrylamide acid copolymer with a weight average molecular weight $\overline{Mw}$=5350 determined by aqueous GPC and corresponding to the feed product for the separation device of test No. 28 but 100% neutralized with soda for said test.
- for test No. 30 illustrating the invention, the 50% partially-neutralized acrylic-methacrylic acid of test No. 28 and with $\overline{Mw}$=6100 but also 100% neutralized for said test with soda after separation.

For each test, the preparation of the aqueous calcium carbonate suspension and its crushing were performed under the same operating conditions and with the same apparatus as for tests No. 4 to 7.

The experimental results are collected in table 9 below:

TABLE 9

| | Experiment No. | Milling Adjuvant Used | | | | | Brookfield Viscosity of the Suspension (at 20° C. in M.Pa.S) with 76% dry matter | | | | | |
|---|---|---|---|---|---|---|---|---|---|---|---|---|
| | | Neutralization for Separation (in %) | Mw | Attenuation in second inflection (%) | Dry extract % | Agent consumption in dry/dry | To 10 T/min | To 100 T/min | 8 days AVAG, 10 T/min | 8 days AVAG 100 T/min | 8 days APAG, 10 T/min | 8 days APAG 100 T/min |
| Prior Art | 29 | 50 Na | 5350 | — | 29.4 | 0.99 | 2090 | 800 | 17500 | 3200 | 3480 | 1350 |
| Invention | 30 | 50 Na | 6100 | 6.8 | 10.0 | 0.95 | 1450 | 540 | 11250 | 2600 | 2000 | 760 |

AVAG: Measure of the viscosity prior to agitation of the suspension
APAG: Measure of the viscosity after agitation of the suspension Reading of table 9 allows us to state that fractionation, with the aid of a capillary membrane, of an acrylic-methacrylamide acid 50% partially neutralized by soda makes it possible to obtain a milling adjuvant or dispersing agent in accordance with the invention for which the molecular-weight distribution curve obtained by aqueous GPC analysis and refractometric detection shows a decrease in the second curvature peak, corresponding to a shoulder, of at least 6.8% with respect to the initial product.

This reading also allows us to state that the milling or dispersing agent in accordance with the invention makes it possible to achieve highly concentrated aqueous suspensions of calcium carbonate more stable than those obtained with the unseparated milling agent of the prior art.

Example 10

This example relates to the obtaining of a dispersing agent in accordance with the invention by the separation, with the aid of a capillary membrane at a temperature ranging from 26° C. to 39° C., of an acrylic and maleic anhydride acid completely neutralized by soda as well as its use as a dispersing agent.

Test No. 31

For this purpose an aqueous solution with 35.3% dry-matter concentration of an acrylic-maleic anhydride acid completely neutralized by soda, with a weight average molecular weight $\overline{Mw}=19800$ determined by aqueous GPC, has been diluted 10% with water purified by reverse osmosis, then separated with the same apparatus as that for test No. 1 and under the conditions described below.

For the GPC measurements, the same standards as those for example 1 are applied.

After 7 hours of operation of the device at a feed flow ranging from 700 to 1200 l/h with a temperature gradually increasing from 26.6° C. to 39.2° C. and a pressure at intake on the order of $3,4.10^5$ Pa to $3,7.10^5$ Pa and at outlet $1,0.10^5$ Pa to $1,1.10^5$ Pa, the retained material collected corresponding to the dispersing agent in accordance with the invention is an acrylic-maleic anhydride acid copolymer completely neutralized by soda having a dry-matter content of 11.7%, a weight average molecular weight $\overline{Mw}=21900$ determined by aqueous GPC and is characterized by a molecular-weight distribution curve obtained by aqueous GPC analysis and refractometric detection showing a decrease of 3.4% with respect to the initial product, in the second curvature peak corresponding to a shoulder when the permeate is an acrylic-maleic anhydride acid completely neutralized by soda having a dry-matter content of 4.0% and a weight average molecular weight $\overline{Mw}=3900$ determined by aqueous GPC.

Tests No. 32 and 33

These tests relate to the preparation of a calcium carbonate suspension by dispersion of said carbonate in water by making use, for test No. 32, of the acrylic-maleic anhydride acid copolymer completely neutralized by soda and with $\overline{Mw}=19800$ corresponding to the feed product for the separation device of test No. 31 to illustrate the prior art and by making use, for test No. 33, illustrating the invention, of the completely neutralized copolymer of test No. 31 and with $\overline{Mw}=21900$.

For this purpose, for test No. 32 illustrating the prior art, there was introduced under agitation in a vessel with a capacity of 1.5 liters and equipped with an agitator disk 50 mm in diameter, 322 grams of water and 17.0 grams of acrylic-maleic anhydride acid completely neutralized by soda and with a dry-matter concentration of 35.3%. There then was added slowly and under agitation on the order of 1000 revolutions/minute, 1000 grams of Norwegian marble with granulometry determined by a Sedigraph 5100 from the Micromeritics company and the equivalent of 75% of the particles sized below 1 micrometer.

After the addition is completed, the agitation is brought up to 8000 revolutions/minute for 10 minutes. At the conclusion of these 10 minutes, the viscosity of the suspension is measured with the aid of a Brookfield RVT-type viscometer at a temperature of 20° C. and a rotation speed of 100 rpm for the No. 3 spindle.

After a settling time of 7 days for the suspension, the viscosity of the suspension is measured by insertion of the No. 3 spindle of the Brookfield RVT-type viscometer into the unagitated vessel at a temperature of 20° C. and a rotation speed of 100 rpm (viscosity AVAG=prior to agitation). The same viscosity measurement is performed once the vessel is agitated and constitutes the result of the viscosity AGAG (after agitation).

For test No. 33 illustrating the invention, there was prepared, with the same apparatus and under the same conditions as for the preceding test, a suspension of Norwegian marble by the use of 288 grams of water, 51.3 grams of the acrylic-maleic anhydride acid copolymer of test No. 31 with $\overline{Mw}=21900$ and a dry-matter concentration of 11.7% and finally 1000 grams of the same Norwegian marble as that for the preceding test. The viscosity measurements were performed with the same operating mode and the same apparatus as those for the preceding test.

The results of these measurements are collected in table 10 below:

TABLE 10

| | | Milling Adjuvant Used | | | | Brookfield Viscosity of the Suspension (at 20° C. in M.Pa.S) with 75% dry matter | | |
|---|---|---|---|---|---|---|---|---|
| | Experiment No. | Neutralization for Separation (in %) | Mw | Attenuation in second inflection (%) | Dry extract % | Agent consumption in dry/dry | To 100 T/min | 7 days AVAG 100 T/min | 7 days APAG 100 T/min |
| Prior Art | 32 | 100 Na | 19800 | — | 35.3 | 0.6 | 300 | 1750 | 270 |
| Invention | 33 | 100 Na | 21900 | 3.4 | 11.7 | 0.6 | 235 | 850 | 260 |

AVAG: Measure of the viscosity prior to agitation of the suspension
APAG: Measure of the viscosity after agitation of the suspension Reading of table 10 allows us to state that fractionation, with the aid of a capillary membrane, of an acrylic-maleic anhydride acid copolymer completely neutralized by soda makes it possible to obtain a dispersing agent in accordance with the invention in which the molecular-weight distribution curve obtained by aqueous GPC analysis and refractometric detection shows a decrease in the second curvature peak, corresponding to a shoulder, of at least 3.4% with respect to the initial product.

This reading also allows us to state that the dispersing agent in accordance with the invention makes it possible to achieve highly-concentrated aqueous calcium carbonate suspensions more stable than those of the prior art.

What is claimed is:

1. A method of producing a milling adjuvant or dispersing agent, comprising
   a) introducing a solution of a water-soluble separand material into a separation apparatus aid apparatus having one or more organic or mineral membranes, said one or more membranes being optionally borne on a support; and
   b) separating said water-soluble separand material into a plurality of permeate and retentate phases both phases containing fractions of said water-soluble separand material, said retentate phases containing higher molecular weight component than said permeate phases, by differences therebetween in hydrodynamic volume in a continuous or batch process;
      wherein at least one of said retentate phases contains said milling adjuvant or dispersing agent, and
      wherein said water soluble separand material is selected from the group consisting of a vinyl polymer, vinyl copolymer, acrylic polymer, acrylic copolymer, polycondensate polymer and polycondensate copolymer; and
      wherein said water-soluble separand material has at least one acidic functional group.

2. The method according to claim 1, further comprising separating said water-soluble separand material at a temperature up to 70° C. and 150° C.

3. The method according to claim 1, further comprising separating said water-soluble separand material at a concentration of 1.5 to 50% based on dry matter.

4. The method according to claim 1, further comprising separating said water-soluble separand material using an aqueous medium.

5. The method of claim 1, further comprising separating said water-soluble separand material using an aqueous-alcoholic medium or an organic solvent medium.

6. The method according to claim 1, wherein in a molecular weight distribution curve obtained by aqueous GPC with a refractometric detection, of one of said retentate phases, a second inflection peak in said curve, corresponding to a shoulder, has an attenuation of at least 3% based on initial said water-soluble separand material.

7. The method according to claim 6, wherein said second inflection peak, corresponding to a shoulder has an attenuation of at least about 10% based on initial said water-soluble separand material.

* * * * *

UNITED STATES PATENT AND TRADEMARK OFFICE
CERTIFICATE OF CORRECTION

PATENT NO.   : 5,961,836
DATED        : October 5, 1999
INVENTOR(S)  : Jean-Bernard Egraz et al.

It is certified that error appears in the above-identified patent and that said Letters Patent is hereby corrected as shown below:

Column 9,
Line 51, "28∞" should read -- 28° --.

Signed and Sealed this

Second Day of April, 2002

Attest:

JAMES E. ROGAN
Attesting Officer   Director of the United States Patent and Trademark Office